Dec. 16, 1941.   M. C. COFFMAN   2,266,620
THICKNESS GAUGE
Filed May 28, 1940
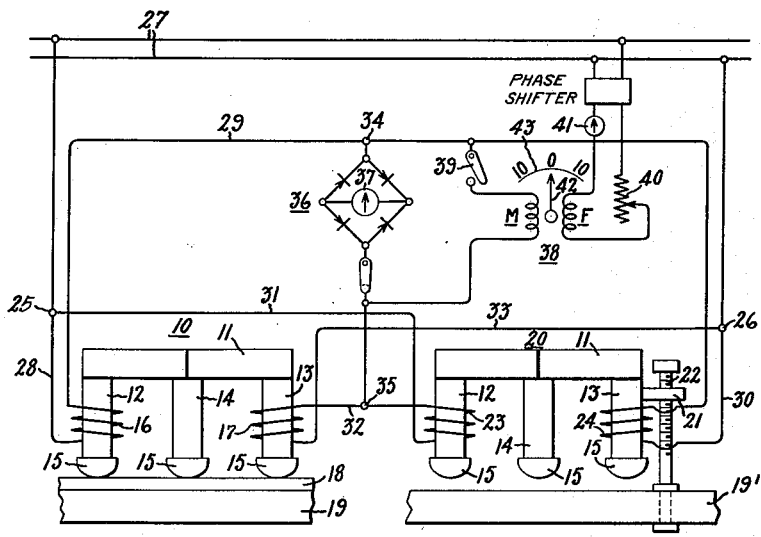
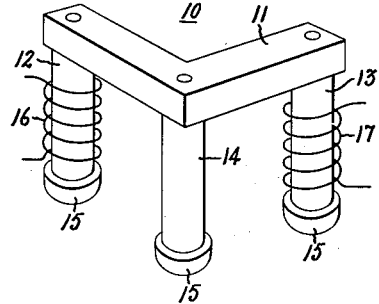
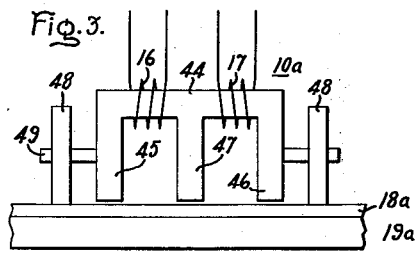
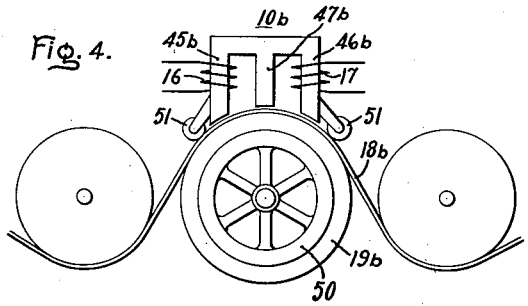
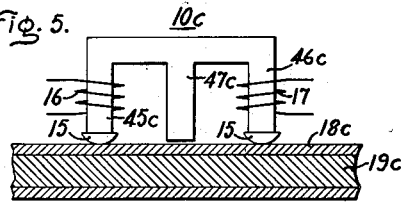
Inventor:
Melvin C. Coffman,
by Harry E. Dunham
His Attorney.

Patented Dec. 16, 1941

2,266,620

UNITED STATES PATENT OFFICE 2,266,620

THICKNESS GAUGE

Melvin C. Coffman, Schenectady, N. Y., assignor to General Electric Company, a corporation of New York Application May 28, 1940, Serial No. 337,603

4 Claims. (Cl. 33—147)

This invention relates to electric gauges and more particularly to electric gauges of the electromagnetic type for measuring the thickness of non-magnetic materials.

It is an object of my invention to provide a new and improved electromagnetic gaugehead adapted for measuring the thickness of non-magnetic materials.

It is another object of my invention to provide an electromagnetic thickness gauge of novel and simple construction which is characterized by high sensitivity.

Other and further objects and advantages of my invention will become apparent as the description proceeds.

In carrying out my invention in its preferred form I provide an electric gaugehead comprising a laminated magnetic core provided with three legs and with current conducting windings positioned in inductive relation with two of the legs of the core and magnetized to produce a flux in the same direction through the other leg. The two gauge coils are connected in diagonally opposite arms of a Wheatstone bridge circuit, and for convenience in measuring the other arms of the bridge circuit preferably comprise similar coils positioned on a balancing unit similar to the gaugehead. The bridge is adapted to be energized across one of its conjugate portions from an alternating current source of supply and a current responsive device is connected across the other conjugate portion of the bridge to respond to the unbalanced current thereof. In making the measurement, the legs of the balancing unit are positioned opposite and in spaced relation to a magnetic backing member and the gaugehead is positioned in a similar manner. The non-magnetic material to be gauged is positioned intermediate the legs of the gaugehead and the magnetic backing member.

The invention may be understood more readily by referring to the following detailed description when considered in connection with the accompanying drawing and the features of my invention which are believed to be novel and patentable will be pointed out in the appended claims. In the drawing Fig. 1 is an electrical circuit diagram illustrating schematically apparatus arranged in accordance with my invention and with the gaugehead positioned for measuring the thickness of a piece of non-magnetic material arranged on a magnetic backing member; Fig. 2 is an elevational view in perspective of the gaugehead and balancing unit employed in the apparatus of Fig. 1; Figs. 3 and 4 are modifications illustrating arrangements whereby the principles of my invention may be employed for continuously measuring the thickness of moving non-magnetic material; and Fig. 5 is a further modification of apparatus embodying the principles of my invention and which may be employed for measuring the concentricity of composite bodies such as welding rods and the like.

Referring to Figs. 1 and 2 of the drawing I have shown a magnetic gaugehead 10, preferably of laminated construction, comprising an angular body portion or yoke 11 of magnetic material having two vertical legs 12 and 13 secured thereto at opposite ends and a vertical core or leg 14 secured at its intermediate portion. The legs may be secured to the yoke 11 in any convenient manner. The material comprising the gaugehead 10 is preferably composed of magnetic material having a relatively high permeability such, for example, as soft iron or a nickel-iron alloy of the character described in the Elmen Patent No. 1,586,884. The tip portions 15 of each of the legs are made preferably of spherical form and arranged out of alignment by means of the angular yoke 11 so that the three points of support form the three corners of a triangle. With this arrangement good surface contact at three points with the material being gauged is always assured.

About the leg 12 and the leg 13 is positioned a current conducting winding 16 and 17, respectively, which when energized in a suitable manner, such as the one presently to be described, are adapted to produce alternating magnetic flux in the central core 14 in the same relative direction. It will be appreciated that under such conditions the reactance of these coils will change in accordance with the air gap or spacing between the tips 15 and the backing member 19, as determined by the thickness of the material 18. In Fig. 1 I have illustrated the gaugehead 10 in the measuring position with the spherical end portions 15 positioned on a non-magnetic member 18 whose thickness is to be measured and which is mounted on a magnetic backing member 19.

In making the measurement of the thickness of the member 18 I prefer to employ a magnetic balancing unit 20 which is of similar construction and material to the gaugehead 10 and adapted to have the spacing between its spherical end portions 15 and a magnetic backing member 19' adjustably varied by any suitable means such, for example, as a bracket 21 which is secured to the magnetic unit 20 and engaged by a screw which is shown rotatably mounted in the backing member 19'. Positioned about the outer legs 12 and 13 of the magnetic unit 20 are current conducting windings 23 and 24, respectively, which when suitably energized are likewise arranged to produce alternating magnetic flux in the same relative direction through an intermediate leg 14. The windings 16, 17, 23 and 24 for reasons which will be obvious are preferably made electrically similar to each other.

The coils or windings 16, 17, 23 and 24 are arranged in a Wheatstone bridge circuit which is adapted to have its input terminals 25 and 26 energized from a suitable alternating current source of supply 27, such as one of the usual commercial frequency or a higher frequency depending upon the rate of relative movement of the material being gauged and the gaugehead. If desired, any suitable means such as a sensitivity control rheostat (not shown), for example, may be connected between the source of supply 27 and the bridge input terminals in order to adjust the sensitivity of the measuring device. The bridge circuit comprises two parallel branches connected between the input terminals. Starting at the terminal 25, one branch includes conductor 28, winding 16, conductor 29, winding 24, and conductor 30; and similarly, the other branch includes conductor 31, winding 23, conductor 32, winding 17, and conductor 33. It will thus be seen that the gauge coils 16 and 17 are connected respectively in diagonally opposite arms of the bridge so that the reactances of the coils constituting these arms are simultaneously increased or decreased, thereby producing a doubling effect on the unbalance of the bridge and thus greatly increasing the sensitivity over that obtainable by changing the reactance of a single coil. Other impedance elements such as resistors, for example, may be included in the arms of the bridge, if desired.

The conjugate portion of the bridge circuit, corresponding to the output terminals 34 and 35, is connected to the input terminals of any desirable current responsive device. In the arrangement illustrated I have shown a copper-oxide rectifier type voltmeter instrument 36 of well known construction which comprises a full-wave rectifier and a d'Arsonval galvanometer type instrument 37. If desired, a dynamometer type measuring instrument 38 of well known construction may be employed for indicating the unbalance currents. In the arrangement illustrated the movable coil M of the instrument is adapted to be connected to the output terminals 34 and 35 of the bridge through a switch 39 while the fixed coil F is arranged to be excited from the same source of supply 27 which excites the bridge circuit. A phase shifting device is preferably employed for bringing the current flowing in the winding F into proper phase relation with respect to the coil in the winding M. An adjustable resistor 40 and a current indicating device 41 may be connected in the circuit of the coil F to adjust the current to the proper value. The instrument 38 is provided with a pointer 42 adapted to cooperate with a zero center scale 43.

Before making the measurement the device may first be calibrated by positioning a piece of non-magnetic material of standard thickness between the end portions 15 and the magnetic backing member 19 of the gaugehead and then adjusting the balancing unit 20 by rotating the screw 22 until the current responsive device 36 or 38 gives a zero indication. With proper calibration this instrument may be made to indicate in terms of actual thickness or in terms of deviations from a standard thickness. I wish to point out that, if desired and within my invention, the indicating device 37 of the current responsive element 36 may be a suppressed zero instrument. For example, I may use a one milliampere instrument and suppress the zero by means of the control springs of the instrument so that one milliampere will be required to start the pointer moving away from zero and two milliamperes to give full scale deflection. When the current responsive device 38 is employed, the pointer 42 may be adjusted to the zero position by means of the phase shifting device and this instrument may then be calibrated in terms of deviations from a standard dimension, if so desired. The sensitivity may be adjusted by means of the rheostat 40.

In order to protect the parts of the electric gaugehead and the balancing unit 20 against dirt, against magnetic dust and against damage, as well as to facilitate ease in handling these members, they may each be mounted in a cover or the like, not shown, of suitable non-magnetic material, such for example, as brass.

The foregoing arrangement is suitable for the measurement of non-magnetic materials of various character, such as for example, glass, enamel, paper, rubber, and the like when positioned against a magnetic backing member.

In Fig. 3, I have illustrated a modified arrangement of the gaugehead which is particularly suitable for continuously gauging the thickness of moving non-magnetic material such, for example, as paper or rubber fabric as it leaves a calendering machine. The gaugehead comprises a substantially E-shaped laminated magnetic core 10a comprising a body portion or yoke 44 in the form of a horizontal bar having two vertical legs or cores 45 and 46, one at either end of the bar and a vertical core or leg 47 positioned intermediate the end cores. In this arrangement, the legs of the magnetic core 10a are positioned in spaced relation with the body 18a whose thickness is to be measured by means of a pair of rollers 48—48 mounted on spindles 49—49 which are secured in any suitable manner to the magnetic member 10a. Current conducting windings 16 and 17 are associated with each of the magnetic circuits including the legs 45, 46 and 47 and they are arranged to produce instantaneous magnetic fluxes in the same direction in the intermediate leg 47 as described in connection with Fig. 1. These coils may be mounted on the yoke portion 44 or on the legs 45 and 46 as desired.

A balancing unit similar to the E-shaped core 10a may be mounted in a manner similar to the core 20 of Fig. 1 and employed for carrying out the measurement operation. In making the measurement the gaugehead 10a may be held stationary and the strip 18a will be free to move relative to the measuring unit.

In Fig. 4 I have illustrated a still further arrangement of a magnetic core 10b which is similar to the E-shaped magnetic core 10a of Fig. 3 but which has the end portions of its legs 45b, 46b, and 47b shaped in complementary relation to the cylindrical surface of a moving strip of non-magnetic material 18b, such as paper or the like, which is adapted to be continuously moved over a revolving roll 50 having a rim or peripheral portion 19b composed of solid or laminated magnetic material which serves as a backing member. The legs of the gaugehead 10b are suitably spaced from the strip of non-magnetic material 18b by means of a plurality of rollers 51. The gauge coils 16 and 17 which are associated with the outer legs 45b and 46b, respectively, and the intermediate leg 47b may be connected in a bridge circuit in conjunction with the coils of a balancing unit in a manner similar to that described in connection with Fig. 1.

In Fig. 5 I have shown an arrangement embodying a substantially E-shaped magnetic core 10c arranged in accordance with my invention and which may be found particularly useful for measuring the degree of eccentricity of composite bars or rods, such as welding electrodes and the like in which a non-magnetic sheath 18c or coating surrounds a central magnetic base or rod 19c. In this arrangement I have illustrated the outer legs 45c and 46c of the core 10c as being provided with spherical tip portions 15 but with an intermediate leg 47c made slightly shorter in length than the other two legs. The gauge coils 16 and 17 associated with the core 10c may be connected as already described for obtaining a thickness measurement by moving the gaugehead 10c around the circumference of the cylindrical member 18c or by holding the magnetic core 10c stationary and rotating the composite rod. Eccentricity of the base portion 19c and the coating or sheath 18c will be made manifest by a change in the reading of the indicating instrument.

I wish to emphasize the advantages of the magnetic and electrical circuit arrangement made possible by the employment of apparatus arranged in accordance with my invention. Because of the fact that the gauge coils 16 and 17 are positioned in diagonally opposite arms of the Wheatstone bridge circuit, a highly sensitive indication is thereby obtained. Furthermore, the arrangement is of simple and compact construction.

It should be pointed out that, while I have shown devices of the indicating type, by the term "current responsive device," I intend to cover arrangements such as recording elements, oscillographs, relays and other devices which may be employed in connection with the arrangements of Figs. 3 and 4, for example, for controlling the thickness of the non-magnetic material as it moves along.

While I have illustrated and particularly described certain embodiments of my invention for the purpose of explaining its principle and showing its application, it will be obvious to those skilled in the art that other modifications and variations are possible and I intend in the appended claims to cover all such modifications and variations which do not depart from the spirit and scope of my invention.

What I claim as new and desire to secure by Letters Patent of the United States, is:

1. In a device for measuring the thickness of non-magnetic material, a gauging magnet and a gauging armature adapted to be maintained in spaced relation to an extent determined by the thickness of the material to be gauged, said magnet comprising end legs and an intermediate leg of magnetic material adapted to be extended toward said armature, said legs being arranged with the portions thereof which extend toward said armature positioned out of alignment with each other, said gauging magnet further comprising a current conducting coil inductively associated with a magnetic circuit including one only of said end legs and said intermediate leg and a second current conducting coil inductively associated with a second magnetic circuit including the other only of said end legs and said intermediate leg, means for energizing said coils from a source of alternating current, a pair of impedance elements connected in series parallel with said coils to form a bridge circuit with said coils arranged diagonally opposite in the bridge, whereby like reactance variations in said coils produce cumulative effects on the unbalance of the said bridge circuit, and current-responsive means in electric circuit relation to said coils for responding to reactance variations in said bridge responsive to the degree of unbalance thereof produced by variations in the spacing of said magnet and armature caused by variation in the thickness of gauged material.

2. In a gauge of the electromagnetic type, an incomplete magnetic core and a magnetic backing member, said magnetic core comprising a yoke and three poles to provide two magnetic circuits and adapted to be arranged with said poles spaced from said magnetic backing member by a gap which varies in accordance with the dimension to be gauged, a first coil inductively associated with one of said magnetic circuits, a second coil inductively associated with the other of said magnetic circuits, a pair of impedance elements connected to said coils to form a bridge circuit, said coils being connected in diagonally opposite arms of the bridge circuit, means for energizing said bridge circuit from a source of alternating current, and current responsive means connected across said bridge.

3. In apparatus of the electromagnetic type for gauging the thickness of non-magnetic material, a substantially E-shaped magnetic core, said core being adapted to have the legs thereof arranged in spaced relation with a magnetic armature, the amount of said spacing being variable in accordance with the thickness of the material to be gauged, a current conducting winding associated with one of the outer legs of said magnetic core and a second current conducting winding associated with the other outer leg of said magnetic core, said windings being adapted to produce magnetic fluxes in said intermediate core in the same relative direction, means connecting said current conducting windings to form diagonally opposite arms of a bridge circuit, means for energizing said bridge circuit from a source of alternating current, and current responsive means connected across said bridge.

4. In a gauge of the electromagnetic type for measuring the thickness of non-magnetic material, an incomplete magnetic core comprising a yoke member, two outer spaced legs, and a third leg positioned substantially equidistant from each of said outer legs, each of said legs being joined to said yoke member at one of its ends and having a substantially spherical surface at its other end, said magnetic core being adapted to be arranged with said spherical surfaces extending toward a magnetic backing member and spaced therefrom a distance determined by the thickness of the material to be gauged, the portions of said legs which include said spherical surfaces being arranged in triangular relation with respect to each other, current conducting windings inductively associated, respectively, one with the magnetic circuit portion including one of said outer legs and said third leg, and the other with the magnetic circuit portion including the other of said outer legs and said third leg, said windings being arranged to magnetize said third leg in the same relative direction, means connecting said windings to form diagonally opposite arms of a bridge circuit, means for energizing said bridge from an alternating current source of supply, and current responsive means connected across said bridge.

MELVIN C. COFFMAN.

CERTIFICATE OF CORRECTION.

Patent No. 2,266,620.                                           December 16, 1941.

MELVIN C. COFFMAN.

It is hereby certified that error appears in the printed specification of the above numbered patent requiring correction as follows: Page 3, second column, lines 3 to 5 inclusive, claim 1, for "coils for responding to reactance variations in said bridge responsive to the degree of unbalance thereof" read --bridge responsive to the degree of unbalance thereof for responding to reactance variations in said coils--; and that the said Letters Patent should be read with this correction therein that the same may conform to the record of the case in the Patent Office.

Signed and sealed this 27th day of January, A. D. 1942.

(Seal)

Henry Van Arsdale,
Acting Commissioner of Patents.